United States Patent Office 3,010,817
Patented Nov. 28, 1961

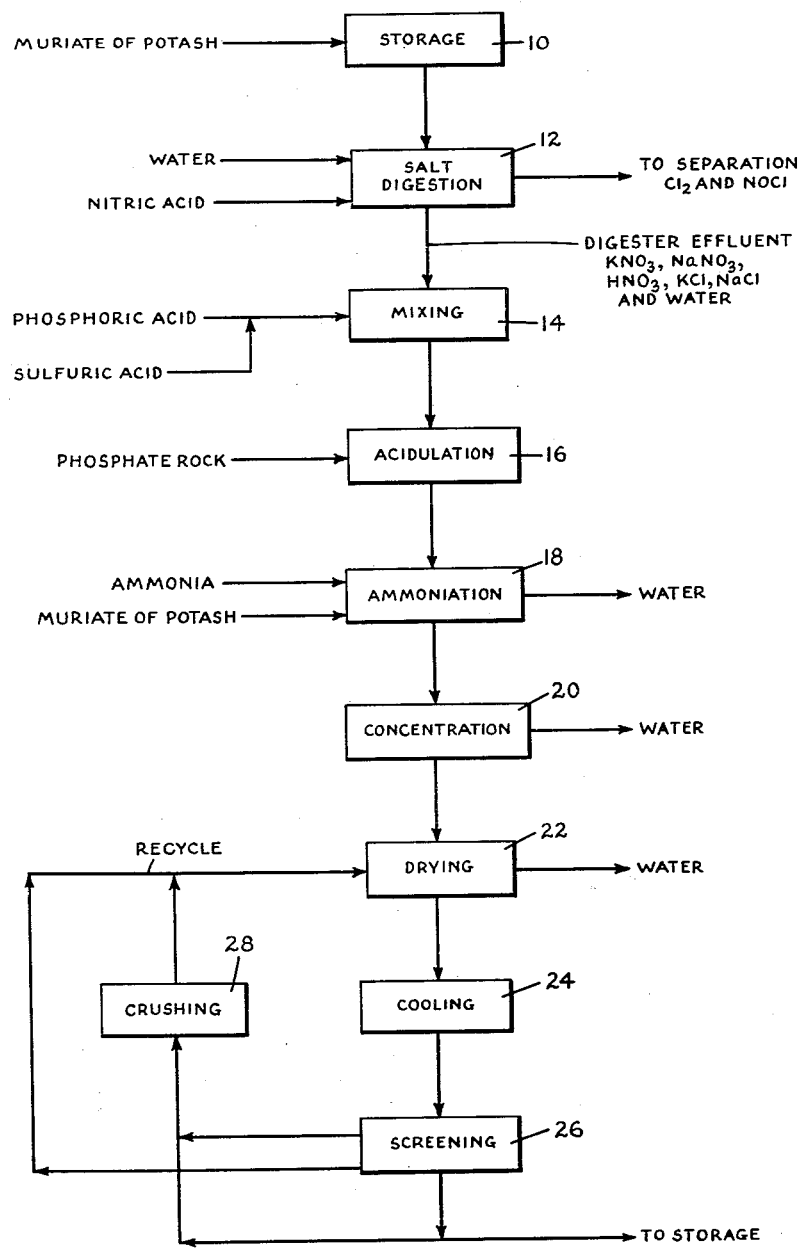

3,010,817
NITRAPHOSPHATE FERTILIZERS WITH
LOW CHLORIDE CONTENT
Eugene D. Crittenden, Petersburg, Va., assignor to Allied Chemical Corporation, a corporation of New York
Filed May 28, 1957, Ser. No. 662,084
8 Claims. (Cl. 71—37)

This invention relates to nitraphosphate fertilizers; more particularly, it relates to fertilizers of this type which have a low chloride content and to the process of making them.

As the amount of potassium is increased, the amount of chloride in the nitraphosphates normally rises as well. This is due to the fact that it is more economical to make use of potassium chloride directly in the manufacture of these mixed fertilizers than it is to use other potassium salts such as potassium sulfate. While the chloride content of the mixed fertilizer is not necessarily harmful, it is well recognized that low chloride fertilizers are preferred for some crops. The problem of holding down the chloride content naturally becomes more acute as the amount of potassium in the fertilizer is increased.

It is, accordingly, an object of this invention to provide a process for making low chloride content fertilizers having a high potassium content while utilizing low cost potassium chloride.

It is a further object of this invention to provide a nitraphosphate having a low chloride content wiht 12–20% N, 8–15% $P_2O_5$ and 7–18% $K_2O$ while utilizing potassium chloride as a source of $K_2O$.

It is a further object of this invention to provide an economic process for the manufacture of fertilizers having a high $K_2O$ content.

In the manufacture of chlorine by the salt process, sodium chloride is normally reacted with nitric acid to yield a mixture of chlorine and nitrosyl chloride and a liquid effluent containing nitric acid and sodium nitrate. However, the salt process can be carried out employing potassium chloride in place of sodium chloride to yield an effluent containing potassium nitrate in place of sodium nitrate. In the following description the expresssion "potassium chloride based chlorine plant effluent" refers to effluent produced in this manner.

In accordance with this invention it has been found that nitraphosphate fertilizers having a low chloride content and a high $K_2O$ content can be prepared with the use of potassium chloride based chlorine plant effluent as the major source of potassium and a large source of nitric acid for the acidulation of phosphate rock and the ultimate production of a granular nitraphosphate fertilizer low in chloride but high in $K_2O$ content.

The drawing is a flow diagram of one embodiment of the preferred process of this invention and graphically illustrates the various steps leading to the final product. The first part of the process as illustrated, is based on the process for producing alkali and alkaline earth metal nitrates as described in the Beekhuis Patent 2,148,429. In accordance with the illustrated flow diagram, potassium chloride is fed from the storage vessel 10 to a reaction vessel 12 along with nitric acid and water. After the reaction has taken place in the reaction vessel 12, chlorine and ntirosyl chloride (NOCl) are separated therefrom, leaving an effluent consisting mostly of potassium nitrate, nitric acid and water. This effluent can then be fed to a mixing vessel 14 to which sulfuric acid and phosphoric acid are also added. The mixture of acids is then fed to the reaction vessel 16 which contains the phosphate rock. After the phosphate rock has been completely acidulated, the treated material is ammoniated and may be further treated with a small additional amount of potassium chloride as shown at 18 and then concentrated to drive off most of the water. The concentrated product is further dried as shown at 22, cooled, screened and crushed. The crushing 28, drying 22, cooling 24 and screening 26 operations may advantageously be carried out in a cyclic process wherein the properly sized particles are removed and sent to storage, while the larger particles and the fines are reworked.

The process is operable to prepare a wide range of nitraphosphate fertilizers. From an economic standpoint, the limits of products presently considered desirable might be outlined as follows:

(A) The total plant food in the range of 36–45%, preferably 40–45%.
(B) The major portion of $P_2O_5$ present being obtained from phosphate rock.
(C) The major portion of $K_2O$ from chlorine plant effluent.
(D) The plant food content as nitrogen equal to or greater than the $P_2O_5$ content of the fertilizer material.

The KCl based chlorine plant effluent which is suitably used as a large source of nitric acid for the acidulation of the phosphate rock in accordance with the process of this invention is the liquid effluent from the boiler section of the digester of a chlorine plant. When feritlizer grade potassium chloride is used in the chlorine plant the effluent normally includes a minor proportion of sodium salts. It is however noteworthy that a representative effluent from the boiler section of such a digester may have approximately the following composition:

| | Wt. percent |
|---|---|
| $HNO_3$ | 20.74 |
| $KNO_3$ | 29.81 |
| $NaNO_3$ | 4.77 |
| KCl | 0.74 |
| Inerts | 0.12 |
| $H_2O$ | 43.82 |

While the effluent is preferably used as is, the water content may be reduced if desired. It is advisable not to reduce the water content below about 25%. A water content in the range 25–50% and a chloride ion content below 0.8% (by weight) in the effluent provide most satisfactory operation.

The chlorine plant effluent is a large source of nitric acid for the acidulation of the phosphate rock but additional nitric acid may be required for some fertilizer formulations. In the acidulation step the acid used is a mixed acid containing nitric and sulfuric acids, nitric and phosphoric acids, or nitric, sulfuric and phosphoric acids employing from about 7 to about 20, preferably from about 8 to about 16, equivalents of mixed acid per mol of $P_2O_5$ in the phosphate rock. By an "equivalent of acid" is meant the quantity of acid which contains one formula weight of hydrogen ion. However, for purposes of the present invention, $H_3PO_4$ is considered a monobasic acid, because during the acidulation of the phosphate rock two hydrogen ions appear to remain with the phosphoric acid.

The phosphate rock, sulfuric acid, phosphoric acid, potassium chloride and ammonia which make up the remainder of the ingredients used in the process of making the granular fertilizer in accordance with this invention are used in the normally available commercial forms used in the production of other commercial fertilizers. A typical formulation for the preparation of a 14–14–14 fertilizer with high $P_2O_5$ availability from a potassium chloride based chlorine plant effluent is as follows:

| Material: | Lbs. per ton of product |
|---|---|
| Effluent (based on a 27% water content) | 1455 |
| Rock (34% $P_2O_5$, 48% CaO) | 533 |
| $H_3PO_4$ (100% basis) | 150 |
| $H_2SO_4$ (100% basis) | 107 |
| KCl (60% $K_2O$) | 23 |
| $NH_3$ | 126 |

This typical formulation is based on the following general requirements:

(1) The chlorine plant effluent is used to supply all or nearly all of the potassium and a large portion of the nitrogen in the product. The effluent also supplies a large portion of the acid needed to convert the phosphate in the rock to an available form.

(2) Phosphate rock containing about 32% to 37% $P_2O_5$ is used as the major source of $P_2O_5$. For fertilizer formulations high in $P_2O_5$ content, phosphoric acid or triple superphosphate is added as a source of concentrated $P_2O_5$.

(3) The equivalents of all acid used are equal to at least 1.2, preferably about 1.3 to 2.6 times the equivalents of $(PO_4)^\equiv$ in the rock. Phosphoric and nitric acid are considered monobasic and sulfuric acid dibasic.

(4) The mols of sulfate and phosphate supplied by the acids, phosphate rock and triple superphosphate are at least equal, preferably 1.02 times as great as the mols of calcium supplied by the rock, triple superphosphate and the impurities in the phosphoric acid.

(5) Ammonia is used to neutralize the mixture obtained from the acidulation of the phosphate rock to a pH of 3.5 to 5.5, preferably to a pH of 3.8 to 4.9.

From a theoretical standpoint, it was to be expected that the presence of potassium nitrate in the reaction mixture containing nitric acid and phosphate rock would have an unfavorable action on the progress of the reaction. The rock is, however, converted to soluble form in a reasonable time. It has been found, that when the acidulation of the rock is carried out with the mixture of effluent, and other mineral acids with a formulation to give 1.3 total equivalents of acid to total equivalents of $PO_4^\equiv$ in the rock, an average of 99.2% of the total $P_2O_5$ becomes available after 10 minutes reaction time, providing the acid mixture was charged at temperatures of 70 to 100° C. or higher. The volume of foam formed by the reaction is considerable and occasionally exceeds five times the liquid volume. However, tests have shown that the nitrogen gases evolved during acidulation contain on the average only 0.02% of the nitrogen in the reaction mixture.

It was to be expected that acidulation of phosphate rock with a chlorine plant effluent containing some chloride would result in excessive corrosion of plant equipment. Surprisingly enough, however, it was found that acidulator mixtures prepared from actual chlorine plant effluent containing the normal amounts of chloride were not excessively corrosive to stainless steels.

The ammoniation of the acidulated product proceeds smoothly with the charge from the acidulator at a temperature about 60 to 130° C. and can be completed in an average time of about 35 minutes. The ammoniation may be considered to be complete when a pH of 3.8 is reached. It has been found that when the calculated amount of ammonia is added the pH will usually fall within the range of 3.8–4.9 which range is quite satisfactory. The ammoniated slurry so formed contains about 18% water and is fluid at temperatures of 100° C. or above. In those cases in which the effluent is used with a water concentration of about 44%, the ammoniated slurry will contain about 30% water. However, in order to minimize reversion of $P_2O_5$ and assure good adsorption of ammonia, it is desirable during the ammoniation procedure to maintain the water content in the slurry at about 17% or more by weight. Accordingly, if the water in the acids and chlorine plant effluent does not provide at least 17% water for the ammoniation, additional water is preferably added.

In some cases it has been found that additional potassium has to be added in order to meet the formulation requirements of $K_2O$ in the final product. When this is necessary, potassium chloride may be added after completion of the ammoniation. The slurry so formed may be concentrated in any suitable manner. For example, the 14–14–14 grade slurry may readily be concentrated in a falling-film evaporator from about 29% water to 8%. Although moisture contents below 8% can be obtained in this manner, it has been found advisable to keep moisture content no less than about 8% if the concentrated slurry is to be pumped. The concentrated slurry can then readily be dried, cooled, screened and crushed to obtain the desired product.

Depending on the fertilizer formulation, the concentration could be reduced to about 2–12% water. Some grades high in nitrogen may be concentrated to less than 2% water content and processed by pebbling instead of drying with recycle. In the production of the 14–14–14 grade the concentration of the ammoniated slurry is of considerable importance since it directly affects the recycle to product ratio. The fact that low concentration is essential to economical working of the process during granulation is readily apparent upon examination of the following table which shows the effect concentration has on recycle to product ratio for a given drier feed water content of 3.4% and recycle water content of 1%.

| | Percent $H_2O$ in Slurry Entering Drier Feed Mixer | Recycle to Product Ratio |
|---|---|---|
| Unconcentrated slurry | 29 | 15.0:1 |
| Slurry concentrated prior to ammoniation step | 18 | 7.4:1 |
| Slurry concentrated in falling-film evaporator with gravity flow to drier feed mixer | 8 | 2.1:1 |

A product made from the formulation given above was found to have the following analysis:

| | Percent |
|---|---|
| N | 14.41 |
| Total $P_2O_5$ | 14.61 |
| Citrate insoluble $P_2O_5$ | 0.47 |
| Available $P_2O_5$ | 14.14 |
| $K_2O$ | 13.8 |
| $H_2O$ | 0.75 |

Example 1

An example of a process for the production of a 14–14–14 fertilizer tied directly to the flow diagram shown in the drawing and giving the quantities of material in pound mols is as follows:

3.74 pm. of KCl and 0.33 pm. of NaCl are fed from the storage vessel 10 to the salt digester 12 into which is also fed 1.120 pm. of water, 9.198 pm. of nitric acid together with 18.919 pm. of water and 0.026 pm. of sodium nitrate, 0.0209 pm. NaCl, 6.581 pm. of water obtained from the vent gas scrubber. These materials are allowed to digest at a temperature of about 123° C. and a pressure of about 3 p.s.i.g. for about 75 minutes. Upon digestion, 1.334 pm. of chlorine and 1.334 pm. nitrosyl chloride are recovered. The digester effluent which contains 3.58 pm. of $KNO_3$, .366 pm. sodium nitrate, 3.858 pm. of nitric acid, .119 pm. of KCl, .013 pm. of NaCl and 29.290 pm. of water is then led into a storage tank where it is admixed with phosphoric and sulfuric acid, the phosphoric acid being introduced in the amount of .98 pm. diluted with 3.209 pm. of water and the sulfuric acid being added in the amount of .729 pm. diluted with .254 pm. of water. This mixture is then sent to the acidulator reaction vessel containing phosphate rock in the amount of .815 pm. $P_2O_5$ and 2.905 pm. CaO. After reaction for ten minutes at a temperature of 80° C. to 90° C., the acidulated material is ammoniated with 4.76 pm. of ammonia which reaction is carried out in about 35 minutes. .126 pm. of KCl and .009 pm. of sodium chloride are then added thereto to increase the $K_2O$ content, after which the ammoniated product slurry is concentrated in a falling-film evaporator to reduce the water content to about 8%. The reaction product is then dried, cooled, screened and crushed to obtain a 14-14-14 fertilizer.

*Example 2*

A 16-8-16 nitraphosphate was prepared from 2182 pounds of chlorine plant effluent liquor with the following composition.

| Material: | Weight percent |
|---|---|
| $KNO_3$ | 30.80 |
| $NaNO_3$ | 5.10 |
| KCl | 0.71 |
| Inerts | 0.17 |
| $HNO_3$ | 21.51 |
| $H_2O$ | 41.71 |

Approximately 59.3 pounds of 60% wet-process phosphoric acid, 150.2 pounds of 93% sulfuric acid and 7.7 pounds of 60% nitric acid were added to the 2182 pounds of effluent. Next 18 pounds of rock phosphate, analyzing 34.1% $P_2O_5$ and 50.04% CaO, was mixed batchwise with 104.2 pounds of the acid mixture for 10 minutes. At the end of this time 99% of the $P_2O_5$ was in an available form by A.O.A.C. test. Then 5.6 pounds of gaseous ammonia was added to the mixture over a period of 25 minutes to bring the pH to about 4.1. The above batch procedure was repeated until all of the mixture of chlorine plant effluent and acid had been utilized. The resultant ammoniated slurry, containing approximately 38% water, was added continuously to a mixer at a rate of 81.1 pounds per hour. Previously dried and crushed material of the same grade, containing 1% water, was fed to the mixer at a rate of 920 pounds per hour at the same time. The mixture, containing 4.0% water, was continuously discharged from the mixer into a rotary drier operated with parallel flow of hot gases. The material was discharged from the drier at about 1% water content and 95-100° C. The drier discharge material was screened and product in the size range of 6 to 30 Tyler mesh withdrawn at a rate of 78.6 pounds per hour. The remainder of the drier discharge material was crushed and recycled for blending with additional ammoniated slurry. Two thousand pounds of product was obtained upon completion of drying of the ammoniated slurry with average analysis of 16.2% nitrogen, 8.4% total $P_2O_5$, 8,2% available $P_2O_5$, 16.2% $K_2O$ and 0.4% Cl. In another test, the ammoniated slurry, prepared as described above, was passed continuously through a falling film evaporator. A flow of air heated to about 130° C. was passed cocurrently with the slurry through the evaporator and the walls of the evaporator were heated to about 185° C. with high pressure steam. The slurry from the evaporator contained approximately 8% water and was fed continuously at a rate of 400 pounds per hour to the drier feed mixer. Simultaneously, previously dried and crushed fertilizer of the same grade containing approximately 1% water was fed to the mixer at a rate of 600 pounds per hour. The drier feed mixture thus prepared contained 3.8% water and was continuously introduced to a rotary drier operated with parallel flow of hot gases in which it was dried to 1% water content. Material discharged from the drier was screened and 370 pounds per hour of particles in the size range of 6 to 30 mesh (Tyler screens) was withdrawn as product. The remaining 600 pounds per hour of dried material was crushed and recycled for preparation of additional drier feed. Products from both methods of drying were identical in appearance and analyses and consisted of hard, semi-spherical granules of uniform chemical composition and with excellent storage properties.

*Example 3*

Nitric acid of about 55% concentration is charged continuously at a rate of 34,500 pounds per hour to the salt digester together with 9,130 pounds per hour of muriate of potash analyzing 60% $K_2O$ and 4.42% NaCl. The liberated gases are removed and recovered and the resultant digester liquid continuously withdrawn at a rate of 37,740 pounds per hour. The analysis of this effluent from the digester follows.

| Material: | Weight percent |
|---|---|
| $KNO_3$ | 30.83 |
| $NaNO_3$ | 1.54 |
| KCl | 0.24 |
| NaCl | 0.01 |
| Inerts | 0.12 |
| $HNO_3$ | 23.12 |
| $H_2O$ | 44.14 |

Approximately 93% sulfuric acid and 40% wet-process phosphoric acid are added to the digester effluent liquor at rates of 2,340 pounds per hour and 6,780 pounds per hour, respectively. This acidic mixture, at a temperature of about 80° C., is continuously fed to a pug-mill type agitator to which phosphate rock analyzing 34% $P_2O_5$ and 50% CaO is also fed at a rate of 11,270 pounds per hour. The mixture of rock and acidic liquor forms a thin slurry which flows continuously through the agitator, being retained approximately ten minutes. At the end of this reaction 99% of the total $P_2O_5$ is in an available form by A.O.A.C. test. The overflow from the pug-mill agitator passes in series through four tanks equipped with agitators and spargers for introduction of gaseous ammonia below the liquid surface. Ammonia is introduced into each of the four agitator tanks, the total addition of ammonia amounting to 2,470 pounds per hour. The ammonia addition is distributed approximately 45 to 60% in the first tank, 20 to 35% in the second tank, 8 to 20% in the third tank and 2 to 10% in the last tank. The heat of reaction of ammonia with the acids causes some boiling of the slurry and some water is thus removed. Three hundred thirty-eight pounds per hour of 60% muriate of potash is added to the last ammoniation tank. The slurry remains in the ammoniation tanks for an average time of 35 minutes and is discharged from the last tank at a pH of about 4.4, a temperature of about 110° C. and a water content of approximately 30%. This slurry, amounting to approximately 56,600 pounds per hour, is concentrated in a falling-film evaporator to a water content of about 8%. The reaction product is then dried, cooled, screened and crushed to obtain 14-14-14 fertilizer.

*Example 4*

Nitric acid of about 65% concentration is charged continuously at a rate of 14,100 pounds per hour to the salt digester together with 4,490 pounds per hour of muriate of potash analyzing 63.0% $K_2O$. The digestion is carried out at 128° C. at atmospheric pressure and $Cl_2$ and NOCl gases are removed. A liquid effluent is withdrawn from the digester at a rate of about 15,340 pounds per hour with approximately the following composition.

| Material: | Weight percent |
|---|---|
| $KNO_3$ | 39.4 |
| KCl | 0.2 |
| $HNO_3$ | 27.0 |
| Inerts | 0.1 |
| $H_2O$ | 33.3 |

The effluent is blended with 477 pounds per hour of 65% nitric acid, 3,190 pounds per hour of 40% phosphoric acid, and 1,250 pounds per hour of 66° Bé. sulfuric acid. The resultant solution is continuously fed to a pug-mill to which 5,800 pounds per hour of phosphate rock, analyzing 34% $P_2O_5$, is added. The slurry formed by the rock and acidic solution is allowed to react for about 10 minutes in the pug-mill and then overflows to four agitator tanks in series. Ammonia is added beneath the liquid level in each tank. A total of about 1,240 pounds per hour of ammonia is required. The heat of reaction of ammonia with the acids results in boiling of the slurry as it passes through the ammoniators and some water is removed in the process. The slurry from the last ammoniator has a pH of about 4 and contains about 20% water. It is dried, cooled, screened and crushed to obtain about 10 tons per hour of a fertilizer with the following analysis:

| | Percent |
|---|---|
| Nitrogen | 14.2 |
| Total $P_2O_5$ | 14.49 |
| Available $P_2O_5$ | 14.2 |
| $K_2O$ | 14.2 |
| Cl | 0.1 |

Example 5

The salt process for preparation for chlorine is operated, using a digester charge of 3,400 pounds per hour of potassium chloride (60% $K_2O$), and 11,000 pounds per hour of 60% nitric acid. The gases liberated by the reaction, chiefly $Cl_2$ and NOCl, are condensed and recovered. The small quantities of gases that are not condensed are passed through a scrubber utilizing a solution of soda ash and sodium nitrate to complete recovery. A quantity of the scrubber solution is continuously withdrawn to prevent build-up of salts and added to the digester. Under these conditions a total of 14,256 pounds per hour of digester effluent is obtained with the following approximate analysis.

| Material: | Weight percent |
|---|---|
| $KNO_3$ | 29.30 |
| $NaNO_3$ | 5.57 |
| $HNO_3$ | 20.74 |
| KCl | 1.1 |
| Inerts | 0.12 |
| $H_2O$ | 43.16 |

About 358 pounds per hour of 93% sulfuric acid, 10,950 pounds per hour of 42% nitric acid, 2000 pounds per hour of phosphoric acid (42.81% $P_2O_5$) and the chlorine plant effluent are continuously fed to a mixer. Florida rock phosphate (34% $P_2O_5$) is simultaneously fed to the mixer at a rate of 3600 pounds per hour and the mixture of rock phosphate, acids, and chlorine plant effluent is retained in the mixer for an average period of two minutes, at the end of which time approximately 99.8% of the total $P_2O_5$ is in an agronomically available form by A.O.A.C. test. The discharge from the mixer is fed to a series of three tanks arranged to overflow from the first to the second to the third by gravity, each equipped with an agitator and a pipe for introduction of ammonia below the liquid surface. The volume of the tanks is such that the slurry is retained in them for an average of 50 minutes. A total of 2066 pounds per hour of gaseous ammonia is introduced to the three agitator tanks. Approximately 60 to 80% of the total ammonia is added in the first tank, 10 to 30% in the second tank and 5 to 15% in the third tank. The overflow from the last tank contains approximately 36% water, and is fed continuously to a falling film evaporator. The walls of the evaporator are heated to 190–200° C. by means of high pressure steam and the slurry discharged from the evaporator at about 170° C. and 1.4% water. This slurry is dispersed into droplets by slinging the slurry off a rotating drum and the droplets allowed to fall freely through a tower about 70 feet high. Product collected contains about 1.1% water, has a bulk density of about 75 pounds per cubic foot, and consists of hard spherical particles with excellent storage properties. Typical size distribution of these particles is as follows:

| | Weight Percent |
|---|---|
| Retained on 10 mesh | 0 |
| Retained on 14 mesh | 59.6 |
| Retained on 20 mesh | 90 |
| Retained on 35 mesh | 99.9+ |

Ten tons per hour are produced by the process with no recycle of dried material required. Analysis of product is 20.4% nitrogen, 10.4% total $P_2O_5$, 10.3% available $P_2O_5$, 10.2% $K_2O$, and 0.4% Cl.

Example 6

The following example demonstrates that effluent may be used with sulfuric acid and no added phosphoric acid or triple superphosphate. First, 100 pounds of phosphate rock analyzing 34.0% $P_2O_5$ and 50.0% CaO was charged to a pug-mill together with 230 pounds of effluent of the same composition as that used in Example 3. Next, 45.4 pounds of 93% sulfuric acid, and 16.0 pounds of 65% nitric acid were added. After ten minutes the mixture was transferred to an agitator tank and anhydrous ammonia added until the slurry pH was 4.2. Approximately 30 minutes was required for addition and a total of 33 pounds of ammonia was required. During ammoniation the heat of reaction caused the slurry to boil and some water was evaporated. The ammoniated slurry contained about 22% $H_2O$. After granulating and drying to about 1% $H_2O$, its composition was found to be 16.5% N, 10.6% available $P_2O_5$, and 10.7% $K_2O$. Chloride analysis of the product was 0.09%.

The process is one in which the acidulation and ammoniation steps can conveniently be carried out batchwise or continuously while the remaining steps are carried out in a continuous manner.

Although certain preferred embodiments of the invention have been disclosed for purpose of illustrative, it will be evident that various changes and modifications may be made therein without departing from the scope and spirit of the invention.

I claim:

1. In a process for producing nitraphosphate fertilizer having a low chloride content with 12–20% N, 8–15% $P_2O_5$, and 7–18% $K_2O$ the steps comprising acidulating phosphate rock with a mixture of (1) a mineral acid selected from the group consisting of sulfuric, phosphoric, nitric, and mixtures thereof and (2) a potassium based chlorine plant effluent over 90% of whose constituents consist of a mixture of $KNO_3$, $HNO_3$ and water and whose chloride content is not more than about 0.8% by weight, ammoniating the acidulated mixture, concentrating and drying the product to give a nitraphosphate fertilizer low in chloride but high in $K_2O$ content, said effluent being the source of more than 50% of potassium in the product and a source of something more than about one-third the nitric acid used in the process.

2. In a process for producing nitraphosphate fertilizer having a low chloride content with 12–20% N, 8–15% $P_2O_5$, and 7–18% $K_2O$ the steps comprising acidulating phosphate rock with a mixture of (1) a mineral acid selected from the group consisting of sulfuric, phosphoric, nitric, and mixtures thereof and (2) a potassium based chlorine plant effluent over 90% of whose constituents consists of a mixture of $KNO_3$, $HNO_3$ and water and whose chloride content is not more than about 0.8% by weight and whose water content is approximately 25–50% by weight, ammoniating the acidulated mixture, concentrating and drying the product to give a nitraphosphate fertilizer low in chloride but high in $K_2O$ content, said effluent being the source of more than 50% of potassium in the product and a source of something more than about one-third the nitric acid used in the process.

3. In a process for producing nitraphosphate fertilizer having a low chloride content with 12–20% N, 8–15% $P_2O_5$, and 7–18% $K_2O_5$ the steps comprising acidulating phosphate rock with a mixture of (1) a mineral acid selected from the group consisting of sulfuric, phosphoric, nitric, and mixtures thereof and (2) a potassium based chlorine plant effluent over 90% of whose constituents consist of a mixture of $KNO_3$, $HNO_3$ and water and whose chloride content is not more than about 0.8% by weight and whose water content is approximately 25–50% by weight, ammoniating the acidulated mixture to form a slurry, concentrating the slurry to a moisture content of about 2–12%, subjecting said concentrated product to drying to obtain the desired product, said effluent being the source of more than 50% of potassium in the product and a source of something more than about one-third the nitric acid used in the process.

4. In a process for producing nitraphosphate fertilizer having a low chloride content with 12–20% N, 8–15% $P_2O_5$, and 7–18% $K_2O$ the steps comprising acidulating phosphate rock with a mixture of (1) a mineral acid selected from the group consisting of sulfuric, phosphoric, nitric, and mixtures thereof including sulfuric and (2) a potassium based chlorine plant effluent over 90% of whose constituents consist of a mixture of $KNO_3$, $HNO_3$ and water and whose chloride content is not more than about 0.8% by weight, ammoniating the acidulated mixture, concentrating and drying the product to give a nitraphosphate fertilizer low in chloride but high in $K_2O$ content, said effluent being the source of more than 50% of potassium in the product and a source of something more than about one-third the nitric acid used in the process and said effluent and mineral acid mixture being employed in an amount to give an approximate formulation of 1.3 to 2.6 total equivalents of acid to total equivalents of $PO_4$ in the rock.

5. In a process for producing nitraphosphate fertilizer having a low chloride content with 12–20% N, 8–15% $P_2O_5$, and 7–18% $K_2O$ the steps comprising acidulating phosphate rock at a temperature of about 70–100° C. with a mixture of (1) a mineral acid selected from the group consisting of sulfuric, phosphoric, nitric, and mixtures thereof and (2) a potassium based chlorine plant effluent over 90% of whose constituents consist of a mixture of $KNO_3$, $HNO_3$ and water and whose chloride content is not more than about 0.8% by weight, ammoniating the acidulated mixture at a temperature of about 60–130° C., concentrating and drying the product to give a nitraphosphate fertilizer low in chloride but high in $K_2O$ content, said effluent being the source of more than 50% of potassium in the product and a source of something more than about one-third the nitric acid used in the process.

6. In a process for producing nitraphosphate fertilizer having a low chloride content with 12–20% N, 8–15% $P_2O_5$, and 7–18% $K_2O$ the steps comprising acidulating phosphate rock at a temperature of about 70–100° C. with a mixture of (1) a mineral acid selected from the group consisting of sulfuric, phosphoric, nitric, and mixtures thereof and (2) a potassium based chlorine plant effluent over 90% of whose constituents consist of a mixture of $KNO_3$, $HNO_3$ and water and whose chloride content is not more than about 0.8% by weight, ammoniating the acidulated mixture at a temperature of about 60–130° C., concentrating and pebbling the product to give a nitraphosphate fertilizer low in chloride but high in $K_2O$ content, said effluent being the source of more than 50% of potassium in the product and a source of something more than about one-third the nitric acid used in the process.

7. In a process for producing nitraphosphate fertilizers having a low chloride content with 12–20% N, 8–15% $P_2O_5$ and 7–18% $K_2O$, the steps comprising acidulating phosphate rock with a mixture of (1) a mineral acid selected from the group consisting of sulfuric, phosphoric, nitric, and mixtures thereof and (2) a potassium based chlorine plant effluent over 90% of whose constituents consist of a mixture of $KNO_3$, $HNO_3$ and water in which the $KNO_3$ and $HNO_3$ are present in approximately equal molar proportions and wherein the chloride content of said effluent is not more than about 0.8% by weight, ammoniating the acidulated mixture, concentrating and drying the product to give a nitraphosphate fertilizer low in chloride but high in $K_2O$ content, said effluent being the source of more than 50% of K in the product and a source of something more than about one-third the $HNO_3$ used in the process.

8. The process of claim 7 in which the acidulation of the rock is carried out with the mixture of effluent and other mineral acids having a formulation to give about 1.3 total equivalents of acid to total equivalents of $PO_4\equiv$ in the rock.

References Cited in the file of this patent

UNITED STATES PATENTS

| | | |
|---|---|---|
| 1,876,501 | Johnson | Sept. 6, 1932 |
| 2,115,857 | Kaselitz | May 3, 1938 |
| 2,614,040 | Kaikinger | Oct. 14, 1952 |
| 2,680,680 | Coleman | June 8, 1954 |
| 2,683,075 | Caldwell | July 6, 1954 |
| 2,783,139 | Datin | Feb. 26, 1957 |
| 2,804,383 | Pike | Aug. 27, 1957 |